United States Patent Office 3,298,122
Patented Jan. 17, 1967

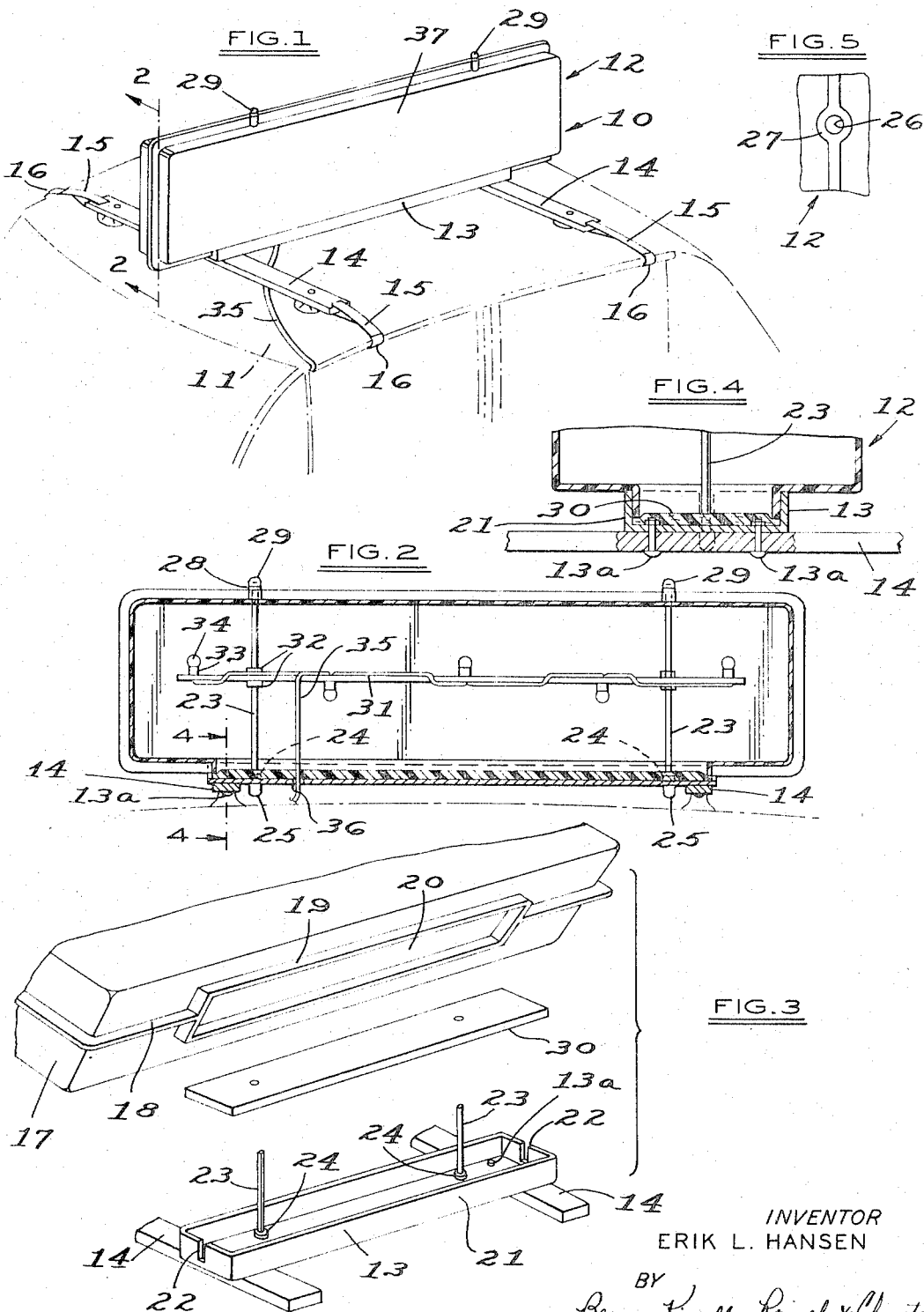

3,298,122
CAR TOP SIGN
Erik L. Hansen, 14740 Charlevoix,
Detroit, Mich. 48215
Filed Oct. 22, 1965, Ser. No. 502,181
10 Claims. (Cl. 40—129)

This invention relates to signs and particularly to signs that are adapted for mounting on a car top.

Among the objects of the invention are to provide a car top sign which is sturdy, simple in construction, low in cost, provides an efficient display of advertising and the like on the sign and is pleasing in appearance.

In the drawings:

FIG. 1 is a fragmentary perspective view of a sign embodying the invention.

FIG. 2 is a fragmentary part sectional view taken along the line 2—2 in FIG. 1.

FIG. 3 is a fragmentary exploded view showing the manner in which the parts are assembled.

FIG. 4 is a fragmentary sectional view on an enlarged scale taken along the line 4—4 in FIG. 2.

FIG. 5 is a fragmentary plan view of a portion of the sign.

Referring to FIG. 1, the sign 10 embodying the invention is adapted to be mounted on a car top 11 and includes a hollow plastic housing 12 that is supported on a metal base 13 by nuts and bolts 13a which, in turn, is fixed to cross bars 14. Adjustable straps 15 are looped through openings in the ends of the bars 14 and hooks 16 are provided on straps 15 to engage the drip trough on the car top 11.

Referring to FIGS. 2-4, the housing 12 is made of translucent plastic such as acrylic plastic. Preferably, the housing is made of two halves 17 which are complementary and include a peripheral flange 18. Portions 19 of the flanges 18 are spaced from one another at the bottom of the housing 12 to form an opening 20 in the bottom of the housing 12. The halves 17 are heat sealed to one another along the complementary flanges 18 to form a unitary housing.

The base 13 includes peripheral flanges 21 that extend upwardly and telescope over the portions 19 of the flanges of the housing. The juxtaposed portions of the heat sealed flanges 18 extend through slots 22 formed by the spaced ends of the flanges 21.

Vertical rods 23 are supported on the base 13 by nuts 24, 25 and extend upwardly through the opening 20 and openings 26 in the upper part of the housing 12 which are formed by spaced portions 27 of the flanges 18 (FIG. 5). A washer 28 and nut 29 are placed in each rod 23 to hold the housing 12 in position on the base 13. A resilient pad preferably of porous foam plastic material 30 is interposed between the bottom of the flanges 19 and the base 13. This pad serves the dual function of absorbing any shock due to movement of the housing 12 relative to the base 13 as might occur when the car is moving along the road and also permits any moisture that might be collected within housing 12 to be absorbed and subsequently pass outwardly through an opening in the base 13.

As shown in FIG. 2, a horizontal mounting plate 31 is fixed on the rods 23 intermediate their ends by nuts 32. The mounting plate 31 supports a plurality of sockets 33 for light bulbs 34. Wiring 35 electrically interconnects the light bulbs 34 and passes downwardly through an opening 36 in the bottom wall 13 so that the wiring can be connected to a source of electricity within the car.

Advertising and the like can be applied to the side panels 37 of the housing 12 by painting, coloring portions of the plastic, molding the plastic or otherwise as will be readily apparent to persons skilled in the art.

It can thus be seen that the sign embodying the invention is sturdy, simple in construction, low in cost, provides an efficient display of advertising and is pleasing in appearance.

I claim:

1. In a sign, the combination comprising a hollow plastic housing,
said housing having side panels adapted to form the viewing portion of the sign,
said housing including an elongated opening in the bottom thereof,
an integral flange extending downwardly and surrounding said opening,
a base,
said base having upstanding flanges surrounding said flange on said housing,
rods extending upwardly through said opening in the bottom of said housing,
said housing having openings in the top thereof through which said rods extend,
and means on said rods for holding said housing on said base,
illuminating means mounted on said rods and supported within said housing by said rods,
and means for supporting said base on a car top.

2. The combination set forth in claim 1 wherein said housing is made of two complementary halves of translucent plastic material,
each half having a peripheral flange extending about the periphery thereof from one side of the opening to the other,
said halves being heat sealed to one another along the complementary portions of the peripheral flanges.

3. The combination set forth in claim 1 wherein said base includes slots through which the portions of the peripheral flanges adjacent the opening in the bottom of the housing extend.

4. The combination set forth in claim 1 including a porous resilient pad interposed between the flange surrounding the opening in the housing and the base.

5. In a sign, the combination comprising a hollow plastic housing,
said housing having side panels adapted to form the viewing portion of the sign,
said housing including an elongated opening in the bottom thereof,
an integral flange extending downwardly and surrounding said opening,
a base,
said base having upstanding flanges surrounding said flange on said housing,
rods extending upwardly through said opening in the bottom of said housing,
said housing having openings in the top thereof through which said rods extend,
means on said rods for holding said housing on said base,
and illuminating means mounted on said rods and supported within said housing by said rods.

6. The combination set forth in claim 5 wherein said housing is made of two complementary halves of translucent plastic material,
each half having a peripheral flange extending about the periphery thereof from one side of the opening to the other,
said halves being heat sealed to one another along the complementary portions of the peripheral flanges.

7. The combination set forth in claim 6 including a porous resilient pad interposed between the flange surrounding the opening in the housing and the base.

8. The combination set forth in claim 5 wherein said housing includes peripheral flanges extending outwardly from the ends of said opening, said base having slots through which said peripheral flanges extend.

9. In a sign, the combination comprising a hollow plastic housing,
   said housing having side panels adapted to form the viewing portion of the sign,
   said housing including an elongated opening in the bottom thereof,
   an integral flange extending downwardly and surrounding said opening,
   a base,
   said base having upstanding flanges surrounding said flange on said housing,
   said housing including peripheral flanges extending outwardly from the ends of said opening, said base having slots through which said peripheral flanges extend,
   rods extending upwardly through said opening in the bottom of said housing,
   said housing having openings in the top thereof through which said rods extend,
   and means on said rods for holding said housing on said base,
   illuminating means mounted within said housing,
   and means for supporting said base on a car top.

10. In a sign, the combination comprising a hollow plastic housing,
   said housing having side panels adapted to form the viewing portion of the sign,
   said housing including an elongated opening in the bottom thereof,
   an integral flange extending downwardly and surrounding said opening,
   said housing being made of two complementary halves of translucent plastic material,
   each half having a generally vertical complementary peripheral flange extending about the periphery thereof from one side of the opening to the other,
   said halves being heat sealed to one another along the complementary portions of the peripheral flanges,
   a base,
   said base having upstanding flanges surrounding said downwardly extending integral flange on said housing,
   said upstanding flanges on said base having slots through which said peripheral flanges of said halves extend,
   rods extending upwardly through said opening in the bottom of said housing,
   said housing having openings in the top thereof through which said rods extend,
   means on said rods for holding said housing on said base,
   and illuminating means supported within said housing.

References Cited by the Examiner

UNITED STATES PATENTS

| | | | |
|---|---|---|---|
| 905,468 | 12/1908 | Shearer | 40—132 |
| 1,942,444 | 1/1934 | O'Connor | 40—129 |
| 2,077,585 | 4/1937 | Rivers | 40—129 |
| 2,559,163 | 7/1951 | MacDonald | 40—129 |
| 2,584,292 | 2/1952 | Rogers | 240—7.1 |
| 2,783,367 | 2/1957 | Locke | 40—129 |
| 2,825,799 | 3/1958 | Julien | 40—129 |
| 2,922,152 | 1/1960 | Del Conte | 40—129 |
| 2,942,367 | 6/1960 | Lee et al. | 40—130 |
| 3,116,027 | 12/1963 | Kleppin | 40—132 |
| 3,170,635 | 2/1965 | Curtin | 240—25 |

EUGENE R. CAPOZIO, *Primary Examiner.*

S. M. BENDER, *Assistant Examiner.*